(12) United States Patent
Branover et al.

(10) Patent No.: US 10,884,477 B2
(45) Date of Patent: Jan. 5, 2021

(54) COORDINATING ACCESSES OF SHARED RESOURCES BY CLIENTS IN A COMPUTING DEVICE

(71) Applicant: Advanced Micro Devices, Inc., Sunnyvale, CA (US)

(72) Inventors: Alexander J. Branover, Chestnut Hill, MA (US); Benjamin Tsien, Fremont, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 515 days.

(21) Appl. No.: 15/298,552

(22) Filed: Oct. 20, 2016

(65) Prior Publication Data
US 2018/0115495 A1 Apr. 26, 2018

(51) Int. Cl.
*G06F 1/3234* (2019.01)
*H04L 12/863* (2013.01)

(52) U.S. Cl.
CPC ............ *G06F 1/3234* (2013.01); *G06F 1/325* (2013.01); *G06F 1/3275* (2013.01); *H04L 47/50* (2013.01)

(58) Field of Classification Search
None
See application file for complete search history.

(56) References Cited

U.S. PATENT DOCUMENTS

| | | | | |
|---|---|---|---|---|
| 9,886,072 | B1* | 2/2018 | Venkataraman | G06F 1/32 |
| 9,940,270 | B2* | 4/2018 | Morales | G06F 13/1642 |
| 2013/0024865 | A1* | 1/2013 | Yamauchi | G06F 9/4843 718/102 |
| 2014/0089282 | A1* | 3/2014 | Sampathkumar | G06F 16/24 707/705 |
| 2014/0331230 | A1* | 11/2014 | Reinhardt | G06F 9/4843 718/102 |
| 2016/0139964 | A1* | 5/2016 | Chen | G06F 1/3206 718/104 |
| 2016/0232037 | A1* | 8/2016 | Depner | G06F 9/5016 |
| 2018/0032379 | A1* | 2/2018 | Meredith | G06F 9/5083 |
| 2018/0234503 | A1* | 8/2018 | Lan | G06F 15/177 |
| 2019/0303005 | A1* | 10/2019 | Candelaria | G06F 3/065 |

* cited by examiner

*Primary Examiner* — Wynuel S Aquino
(74) *Attorney, Agent, or Firm* — Park, Vaughan, Fleming & Dowler LLP

(57) ABSTRACT

The described embodiments include a computing device with a plurality of clients and a shared resource for processing job items. During operation, a given client of the plurality of clients stores first job items in a queue for the given client. When the queue for the given client meets one or more conditions, the given client notifies one or more other clients that the given client is to process job items using the shared resource. The given client then processes the first job items from the queue using the shared resource. Based on being notified, at least one other client that has second job items to be processed using the shared resource, processes the second job items using the shared resource. The given client can transition the shared resource between power states to enable the processing of job items.

17 Claims, 3 Drawing Sheets

COORDINATING ACCESSES OF SHARED RESOURCES BY CLIENTS IN A COMPUTING DEVICE

BACKGROUND

Related Art

Many computing devices include resources that are shared by two or more hardware or software clients, i.e., "shared resources," that can be used for processing job items for the clients. For example, clients such as central processing units (CPUs) and graphics processing units (GPUs) may share access to a memory in the computing device and may use the memory for processing job items such as memory access requests, memory metadata updates, etc. As another example, clients such as processors and peripherals may share access to a data fabric or an interconnect in the computing device and may use the data fabric or interconnect for processing job items such as data or control communications.

In some computing devices, accesses by clients to shared resources are not coordinated, so that the clients access the shared resources with little or no regard for accesses being made by other clients in the computing device. Such uncoordinated accesses can result in suboptimal operation of the clients and/or the shared resource. For example, in some computing devices, shared resources are transitioned to a lower-power state when not being accessed by clients in order to conserve electrical power, avoid generating heat, avoid wear on circuits, etc. When clients access such shared resources, the shared resources are transitioned into a higher-power state to enable processing job items for the clients. The shared resources are then returned to the lower-power state when no longer processing job items for the clients. Each transition between power states takes time, costs electrical power, and may load other functional blocks in the computing device. When clients access shared resources in an uncoordinated fashion, the transitions between power states can end up being costlier, in terms of electrical power consumption, delay, etc., than the job items that shared resources are transitioned between power states to enable processing.

BRIEF DESCRIPTION OF THE FIGURES

Throughout the figures and the description, like reference numerals refer to the same figure elements.

DETAILED DESCRIPTION

Figure 1:
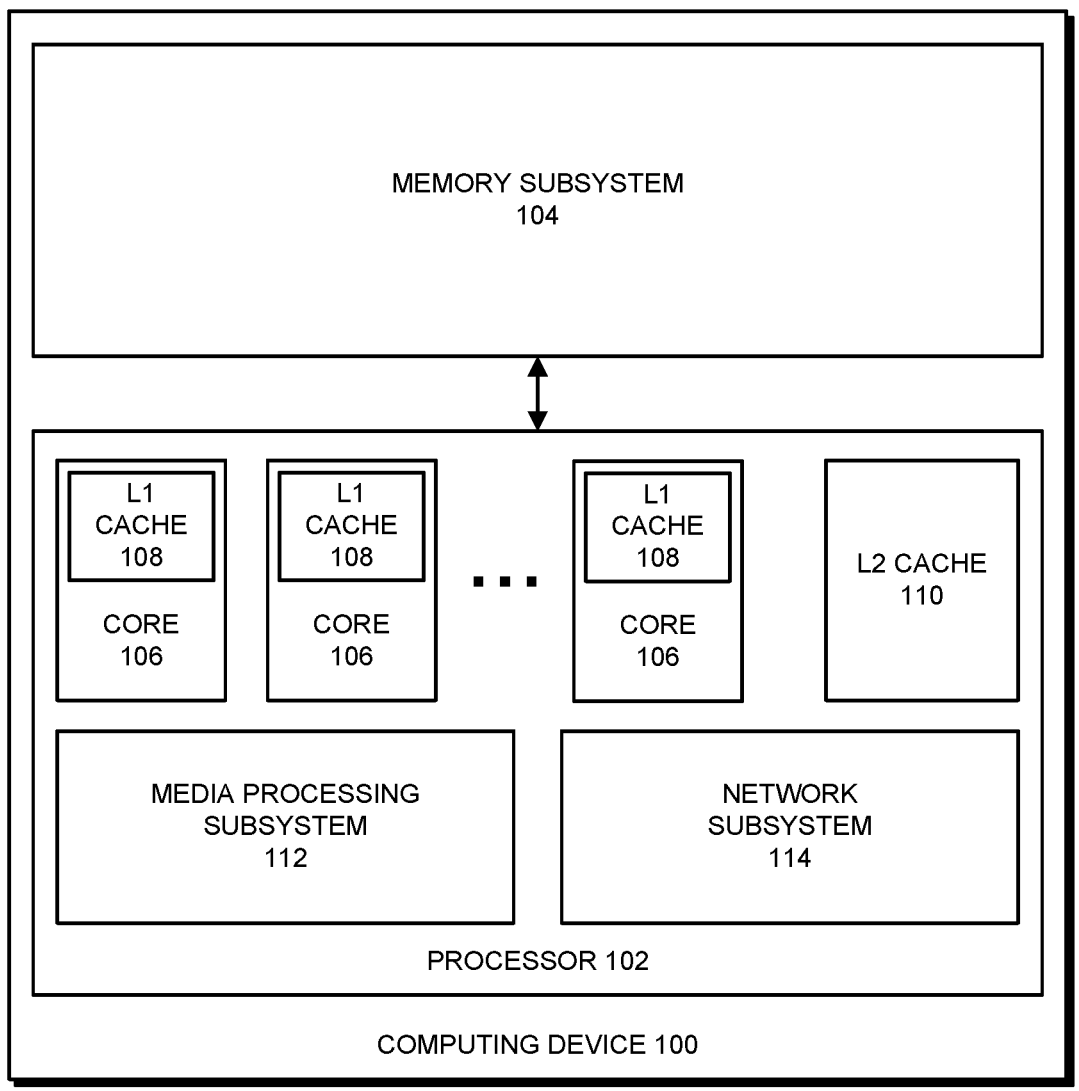
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms may be used for describing embodiments. The following section provides simplified and general descriptions of some of these terms. Note that some or all of the terms may have significant additional aspects that are not recited herein for clarity and brevity and thus these descriptions are not intended to limit the terms.

Job Items: job items are operations that can be performed, requested, and/or caused by clients in a computing device. Job items can include operations, or subsections or combinations thereof, such as memory access requests (e.g., memory reads/writes, memory metadata updates, etc.), media processing requests (e.g., audio/video processing, encoding/decoding, graphics processing, etc.), computational operations (e.g., mathematical or logical operations, bitwise operations, etc.), network access requests, etc.

Clients: clients are hardware, software, or firmware entities in a computing device that process job items (and may perform other operations). For example, the hardware entities can include central processing units (CPUs) or CPU cores, graphics processing units (GPUs), and/or other processors in the computing device, network subsystems, media processing subsystems, memory subsystems, etc. As another example, the software entities may include operating systems, firmware, application programs, routines, etc.

Overview

The described embodiments include a computing device with multiple clients and a resource, i.e., a "shared resource," that is shared among the clients and used for processing job items for the clients. For example, the clients can include processor cores, the shared resource can include a memory subsystem, and the job items can be memory access requests. In the described embodiments, clients perform operations for coordinating accesses of the shared resource.

In the described embodiments, some or all of the clients, e.g., clients A, B, C, etc. receive, generate, or otherwise acquire job items to be processed using the shared resource. At least one of the clients, e.g., client A, buffers received job items in a queue until the queue meets one or more conditions, and then notifies others of the plurality of clients, clients B, C, etc., that client A is to process job items using the shared resource. For example, client A buffers the received job items in the queue until the queue reaches a specified level of fullness or emptiness, until a given number of a particular type of job items are buffered in the queue, etc., and then notifies clients B, C, etc. by asserting a signal on dedicated signal line(s) to clients B, C, etc., sending a corresponding message to clients B, C, etc. and/or otherwise notifying clients B, C, etc. Client A then begins processing the buffered job items from the queue using the shared resource. Clients B, C, etc., may also, based on receiving the notification from client A, contemporaneously process job items using the shared resource. For example, clients A, B, C, etc. may send requests to process the job items that are handled by the shared resource in the order received, in a round-robin pattern, and/or in another way. In this way, clients A, B, C, etc. coordinate accesses of the shared resource via the notification sent by client A.

In some embodiments, the shared resource is transitioned from a lower-power state to a higher-power state by a client to enable the coordinated processing of shared resources as described above. For instance, and continuing the example above, upon the queue meeting the condition, client A may send a request to the shared resource, to the computing device, to a power manager, and/or to another entity to directly or indirectly cause the shared resource to transition from the lower-power state to the higher-power state to enable the processing of job items. In some embodiments, after some or all of clients A, B, C, etc. have processed job items (i.e., processed job items available to be processed at the time), the shared resource is returned to the lower-power state. For example, after processing the job items from the queue, client A sends a request to the shared resource, to the computing device, to the power manager, and/or to the other entity to directly or indirectly cause the shared resource to return to the lower-power state from the higher-power state. In this way, the shared resource can be powered up for processing job items and then restored to the lower-power state to conserve electrical power, avoid generating heat, avoid wear on components, etc.

In some embodiments, the clients are logically organized into a multi-level hierarchy, with each level including a different subset of the clients. For instance, clients A, B, C, and D may be organized in a multi-level hierarchy, with clients A, B, and C in a first level of the hierarchy and client D in a second level. For this example, clients A, B, and C "locally" notify the other clients on the first level when job items are to be processed as described above, but do not notify clients in the second level. In this way, coordination of accesses to locally shared resources (e.g., signal buses, local memories or caches, processors, etc.) is performed. In some of these embodiments, notifications are sent between the levels of the multi-level hierarchy when certain shared resources (e.g., globally shared resources such as a memory system, processors, etc.) are to be accessed to process job items.

In some embodiments, one or more clients process items independently of one or more other clients in the computing device, i.e., without performing the above-described notification of the one or more other clients and/or without first receiving notification from the one or more other clients. For example, one or more clients are designated "masked" clients, which are configured, perhaps dynamically, to process job items independently of the one or more other clients in the computing device. For instance, a client having a corresponding priority (high or low) or executing a specified software application is designated a masked client. As another example, normal/unmasked clients sometimes process job items without notifying other clients and/or without receiving a notification from another client. For example, clients may immediately process job items upon determining that certain numbers or types of job items have been received, that a specified time has passed since the first buffered job item was received, etc. In this way, these clients can avoid unnecessarily long delays, holding specified types of job items in the queue (e.g., high priority job items, etc.), etc.

By coordinating accesses of the shared resource by clients, the described embodiments can access the shared resource more efficiently. For example, clients can send job items to the shared resource at a time when the shared resource is already in a higher-power state, i.e., not in a lower-power state, thereby avoiding transitions between power states for the shared resource that may be performed if the clients were to process job items using the shared resource without coordinating. The described embodiments can therefore save the electrical power required to transition the shared resource between the power states for processing job items and avoid the delay required for the transitions. This can enable the computing device to operate more efficiently in terms of electrical power consumption, job item processing speed, etc., which can improve user satisfaction with the computing device.

Computing Device

FIG. 1 presents a block diagram illustrating a computing device 100 in accordance with some embodiments. As can be seen in FIG. 1, computing device 100 includes processor 102 and memory subsystem 104. Processor 102 is a device that performs computational operations in computing device 100. Processor 102 includes three cores 106, each of which includes one or more computational mechanisms such as central processing units (CPUs), graphics processing units (GPUs), embedded processors, application specific integrated circuits (ASICs), and/or other computational mechanisms.

Processor 102 also includes cache memories, or "caches," that are used for locally storing data and instructions that are used by the cores 106 for performing computational operations. As can be seen in FIG. 1, the caches in processor 102 include level-one (L1) caches 108 in each of the cores 106. Each L1 cache includes memory circuits such as one or more of static random access memory (SRAM), dynamic random access memory (DRAM), double data rate synchronous DRAM (DDR SDRAM), and/or other types of memory circuits for storing data and instructions for use by the corresponding core 106, as well as control circuits for handling accesses of the data and instructions that are stored in the memory circuits. Processor 102 additionally includes a shared level-two (L2) cache 110 that includes memory circuits such as one or more of SRAM, DRAM, DDR SDRAM, and/or other types of memory circuits for storing data and instructions for use by all of the cores 106, as well as control circuits for handling accesses of the data and instructions that are stored in the memory circuits.

Processor 102 further includes media processing subsystem 112 and network subsystem 114. Media processing subsystem 112 is a functional block that includes circuits for performing media (e.g., audio and video) processing operations such as audio and video encoding and decoding, video capture, audio and video playback, etc. Network subsystem 114 is a functional block that includes circuits for performing operations for connecting to and communicating on one or more wired or wireless networks, such as network interfaces, network stack hardware elements, codecs, etc.

Memory subsystem 104 is the "main memory" of computing device 100, and includes memory circuits such as one or more of DRAM, DDR SDRAM, non-volatile random access memory (NVRAM), and/or other types of memory circuits for storing data and instructions for use by functional blocks in computing device 100, as well as control circuits for handling accesses of the data and instructions that are stored in the memory circuits.

In some embodiments, communication paths (that include one or more busses, wires, guides, and/or other connections) are coupled between the various functional blocks in computing device 100, as shown by arrow-headed lines between the elements. The communication paths are used to transmit commands, data, control signals, and/or other information between the functional blocks. In some cases, communication paths and corresponding hardware, which may be called "fabrics" herein, have been omitted for clarity and brevity.

Although embodiments are described with a particular arrangement of cores in computing device 100, some embodiments include a different number and/or arrangement of cores. For example, some embodiments have only one core, while other embodiments have two, five, eight, or another number of cores. Generally, the described embodiments can use any arrangement of cores that can perform the operations herein described.

Although embodiments are described with a particular arrangement of caches, some embodiments include a different number and/or arrangement of caches. For example, some or all of the caches may be divided into separate instruction and data caches. Additionally, L2 cache 110 may not be shared, and hence may only be used by a single core (i.e., there may be multiple L2 caches in processor 102). As another example, some embodiments include different levels of caches, from only one level of cache to multiple levels of caches, and these caches may be located in processor 102 and/or external to processor 102. Generally, the described embodiments can use any arrangement of caches that can perform the operations herein described.

Computing device 100 and processor 102 are simplified for illustrative purposes in FIG. 1. In some embodiments, however, computing device 100 and/or processor 102 include additional or different elements and mechanisms for performing the operations herein described and other operations. For example, computing device 100 and/or processor 102 may include power controllers, batteries, input-output mechanisms, communication mechanisms, display mechanisms, etc.

Computing device 100 can be, or can be included in, any electronic device that performs computational operations. For example, computing device 100 can be, or can be included in, electronic devices such as desktop computers, laptop computers, wearable computing devices, tablet computers, smart phones, servers, network appliances, toys, audio-visual equipment, home appliances, controllers, vehicles, virtual reality or augmented reality equipment, and/or combinations thereof.

Clients and a Shared Resource

Figure 2:
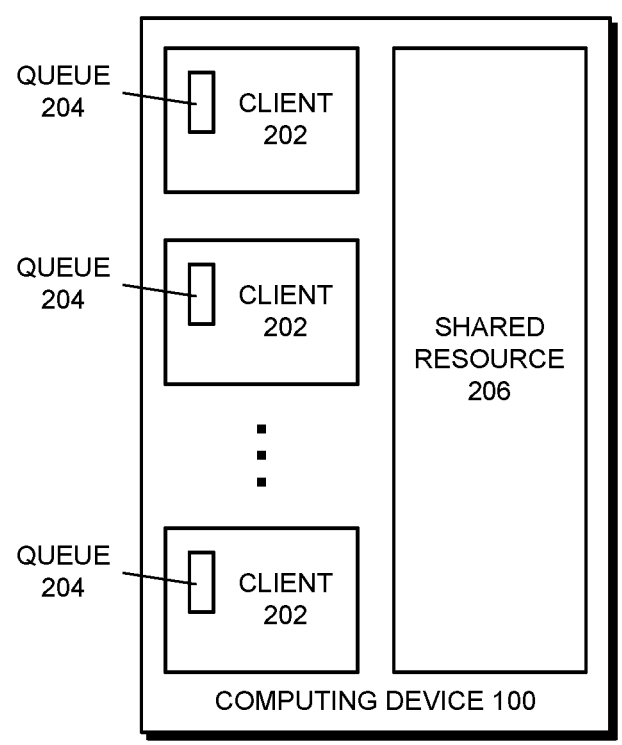
FIG. 2 presents a block diagram illustrating clients and a shared resource in accordance with some embodiments.

FIG. 2 presents a block diagram illustrating clients and a shared resource in accordance with some embodiments. As described above, clients are hardware or software entities in a computing device that process job items and possibly perform other operations. For example, clients 202 may include cores 106, media processing subsystem 112, network subsystem 114, or portions of one or more of these functional blocks.

As can be seen in FIG. 2, each client 202 includes a queue 204. Each queue 204 includes a hardware functional block and/or a software data structure in which job items are stored/buffered by the corresponding client 202 along with zero or more other job items, and then subsequently retrieved for processing by the corresponding client 202. For example, job items such as memory access requests are stored in queue 204 by the corresponding client 202 and subsequently retrieved by the corresponding client 202 for performing the associated memory accesses. In some embodiments, each queue 204 includes and/or is stored in a functional block such as a dedicated memory element (e.g., a DRAM block) in the corresponding client 202, in a cache, and/or in memory subsystem 104.

In some embodiments, each queue 204 is sized to hold a corresponding maximum number of job items. For example, the size of the queue may be based on impact to operational performance of queuing job items, job item sizes, job types, etc. In other words, in these embodiments, each queue 204 is sized based on the operations performed by the client, the delay acceptable to the client, and/or other aspects of storing job items in the queue 204.

In some embodiments, metadata that is used by the corresponding client for determining if queue 204 meets a condition (as described herein) is stored in queue 204 (e.g., in corresponding variables or records in the queue 204) and/or is otherwise associated with queue 204. For example, the metadata for each queue 204 may include one or more indicators of queue fullness or emptiness, one or more descriptors of types of the job items, an enqueued job item counter, one or more timers, etc.

Shared resource 206 is a hardware or software entity in the computing device 100 that is shared among multiple clients and is used for processing job items by the sharing clients. For example, shared resource 206 may include cores, a media processing subsystem, a network subsystem, a memory subsystem, or portions of one or more of these functional blocks (e.g., an SRAM or DRAM memory within the memory subsystem), or other functional blocks in the computing device.

In some embodiments, shared resource 206 can be transitioned between power states including a lower-power state and a higher-power state. In the lower-power state, a voltage or current supplied to shared resource 206 may be reduced, possibly to the point where some or all of the circuits in shared resource 206 are non-functional. Alternatively or additionally, one or more control signals or clock signals to shared resource 206 may be deasserted/asserted or set to certain values, stopped, etc. to halt processing in at least some circuits in shared resource 206. For example, the lower-power state may be a sleep state, a powered off state, a hibernation state, etc. for some or all of the circuits in shared resource 206. In the higher-power state, the voltage, current, control signal, and/or clock signal may be supplied in such a way to enable processing by some or all of the circuits in shared resource 206. For example, the higher-power state may be a full-power state, a powered on state, a normal or accelerated processing state, etc. for the circuits in shared resource 206.

Although computing device 100 is presented with three clients, different numbers or arrangements of clients may be present (as shown by the ellipsis in FIG. 2). The same is true for shared resource 206, i.e., there may be two or more shared resources in computing device 100.

Although each client is shown with a queue, not all of the clients are required to have queues. For example, one or more of the clients may function without a queue, e.g., may be a masked client as described elsewhere herein and/or may not buffer job items in a queue. As another example, the queue for the client may be located elsewhere in computing device, such as in another functional block.

Although a client may be considered a client in one situation and/or with regard to a particular resource, the same entities can also be considered shared resources in other situations, and vice versa. For example, the media processing subsystem may be considered a shared resource for various functional blocks and/or in certain use cases, but may also be considered a client with regard to a shared resource such as the memory subsystem and/or in other use cases. In some embodiments, which functional blocks are clients and which are shared resources is dynamically determined by the clients and/or the computing device at runtime (i.e., as the computing device operates) and may change one or more times.

Process for Coordinating Accesses of Shared Resources by Clients

Figure 3:
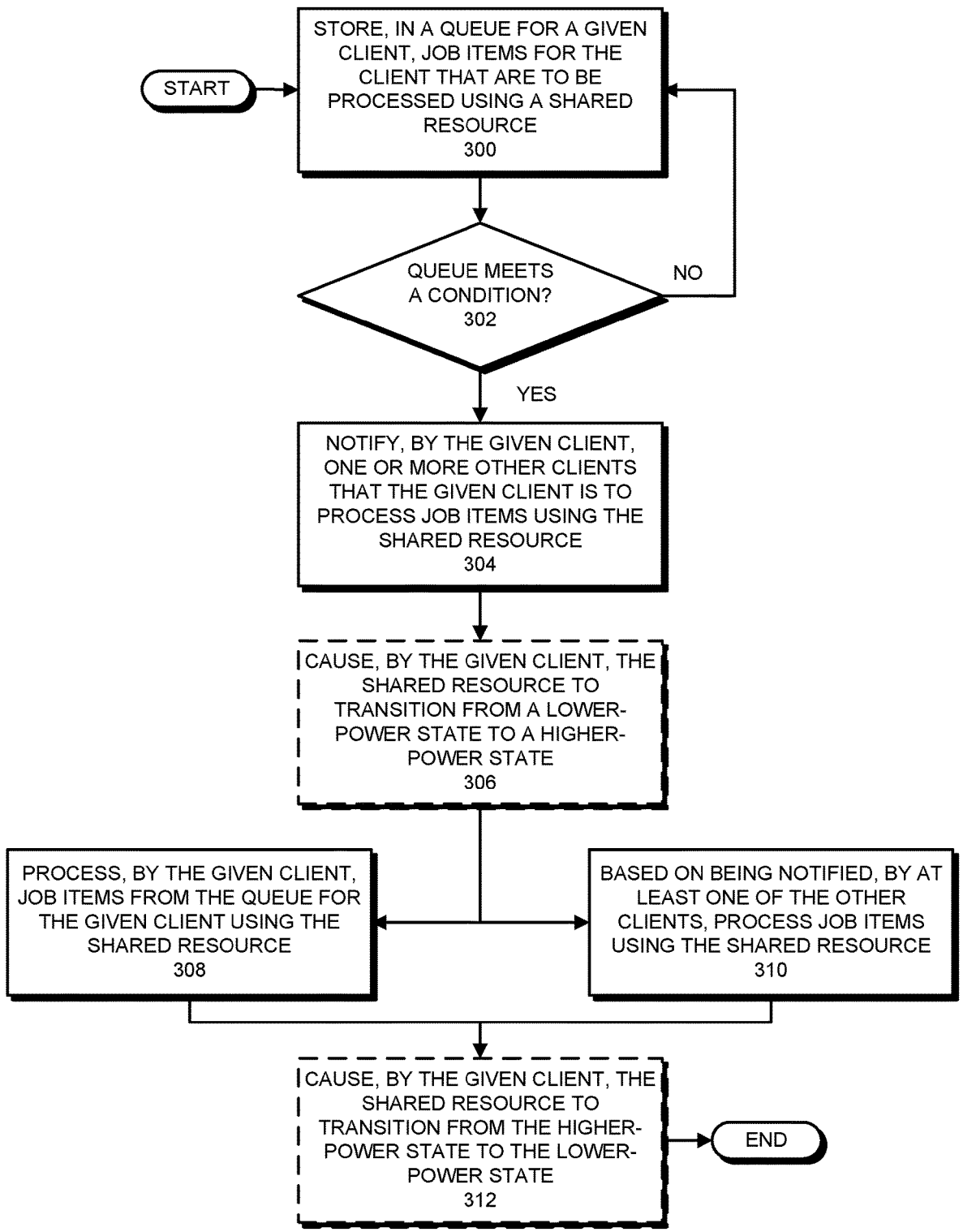
FIG. 3 presents a flowchart illustrating a process for coordinating accesses of shared resources by clients in accordance with some embodiments.

The described embodiments perform operations for coordinating accesses of shared resources by clients in a computing device. FIG. 3 presents a flowchart illustrating a process for coordinating accesses of shared resources by clients in accordance with some embodiments. The operations shown in FIG. 3 are presented as a general example of operations performed by some embodiments. The operations performed by other embodiments include different operations and/or operations that are performed in a different order. Additionally, although certain mechanisms/elements are used in describing the operations (e.g., cores, etc.), in some embodiments, other mechanisms perform the operations and/or the operations are performed on other mechanisms/elements.

For the example in FIG. 3, cores are used as clients, memory access requests are used as an example of job items, and the memory subsystem in the computing device is used as an example of a shared resource. This is one example of clients, job items, and a shared resource. As described above, the job items can be any operations that can be performed, requested, and/or caused by clients in a computing device. In addition, the shared resources can be any resource or combination of resources that can be used for processing job items in the computing device.

The process shown in FIG. 3 starts when a given client stores, in a queue for the given client, job items for the client that are to be processed using a shared resource (step 300). For example, a core (i.e., the given client) can receive from another entity (e.g., another core, a peripheral, etc.), generate, and/or otherwise acquire memory access requests (i.e., the job items) and store the memory access requests in the queue. When storing the memory access requests in the queue, the core may delay the processing of the memory access requests. In other words, the memory access requests are stored in the queue and not immediately sent to the memory subsystem for processing. In this way, the core holds or buffers the memory access requests in the queue until, as described below, a condition is met by the queue.

The given client then determines if the queue meets a condition (step 302). For this operation, the core (i.e., the given client) monitors, queries, or otherwise acquires information about the queue and uses the information about the queue to determine if the queue meets the condition. For example, the core maintains or acquires metadata associated with the queue such as a counter value, a level indicator, and/or a head or tail pointer that can be used to determine a fullness of the queue and/or a number of memory access requests in the queue. Using the information, the core determines if the queue meets a condition for fullness or emptiness (i.e., is the queue more than 80% full, less than 35% empty, etc.), average number of memory access requests in the queue over a time period, etc. As another example, the core keeps or acquires a count of memory operations in an execution pipeline and uses the count of the memory operations to determine and/or estimate if a fullness of the queue meets a condition for the fullness of the queue. As yet another example, the core receives, from one or more other entities in the computing device, a signal, packets, messages, and/or other information that can be used to determine that the queue holds more than a threshold number of memory access requests. For example, a load/store unit sends one or more messages indicating a number of memory access requested produced by the load/store unit and thus the memory access requests held in the queue. As yet another example, the core determines if the queue holds more than a given number of one or more specified types of memory access requests. In this case, different memory accesses are identified as different types using one or more of the source of the memory access request, the destination/address to which the memory access request is directed, the urgency or service level of the memory access request, etc. When more than a given number of, e.g., high-urgency memory access requests are held in the queue, the queue can be determined to meet the condition.

When the queue does not meet the condition (step 302), the given client returns to step 300. By operating in this way, the core (i.e., the given client) is waiting for sufficient memory access requests to be held in the queue to perform subsequent operations in FIG. 3. Note that, although not shown in FIG. 3, in some embodiments, memory access requests held in the queue may sometimes be processed without further delay. For example, if an oldest memory access request in the queue is older than a given threshold amount of time or if certain types of job items are stored in the queue, some or all of the memory access requests in the queue are processed without further delay. In some of these embodiments, steps 304 and 310 may not be performed when processing job items under this condition. In other words, the core processes some or all of the memory access requests from the queue without notifying other clients.

When the queue meets the condition (step 302), the given client notifies one or more other clients that the given client is to process job items using the shared resource (step 304). For this operation, the core (i.e., the given client) sends one or more messages, signals, packets, and/or other information to the other clients to indicate that the memory access requests are to be processed. For example, the core sends a signal on one or more wires, signal lines, buses, etc. that are received by the other clients and understood by the other clients to indicate that the core (or at least another client) is to process memory access requests. As another example, the core generates a packet in a determined format and broadcasts, multicasts, or unicasts the packet to the other clients using a corresponding communication protocol on general-purpose or dedicated signal line(s) such as a communication bus and/or wirelessly using electromagnetic signals, etc. In this case, the packet can include different amounts and/or types of information, depending on the capacity and format of the packet. For instance, the information includes a simple indication that the memory access requests are to be processed using the shared resource, or includes detailed information such as a number of buffered memory access requests, one or more destinations of the memory access requests, an expected time of processing the memory access requests, one or more control values such as delays to be used by the receiving client when processing memory access requests, etc. Upon receiving the notification, regardless of the form of the notification, the other clients are able to determine at least that another client (i.e., the core) is preparing to process memory access requests using the memory subsystem.

In an optional step, the given client then causes the shared resource to transition from a lower-power state to a higher-power state (step 306). For example, the core (i.e., the given client) causes a memory interface, a memory bus, memory banks, and/or another functional block in the memory subsystem to transition from a sleep, hibernate, and/or other low-power state in which memory operations are limited or impossible to a higher-power state such as a normal or full-power operating state in which memory operations may be performed normally. By causing the transition between power states as described, the core prepares the memory subsystem for processing the memory access requests in the queue.

Operation 306 is "optional" in that the shared resource may already be in the higher-power state. In this case, the operations in FIG. 3 can be carried out without step 306. Transitioning the memory system (i.e., the shared resource) between power states as described, however, enables the core (i.e., the given client) to "wake" the shared resource so that the buffered memory access requests can be processed. In addition, as described below, sending the notification to the other clients enables clients that have memory access requests to be processed to process these memory access requests at a time when the memory subsystem has already been transitioned to the higher-power state. This can avoid the need for the other clients to subsequently transition the memory subsystem between the lower-power and higher-power states in order to process memory access requests.

The given client then processes job items from the queue for the given client using the shared resource (step 308). Continuing the example above, this operation includes the core (i.e., the given client) retrieving buffered memory access requests from the queue for the core and forwarding the memory access requests to the memory subsystem for processing. Depending on the type of memory accesses buffered in the queue, processing the memory access request can involve reading data from the memory, writing data to the memory, updating metadata (permissions, etc.) in the memory, and/or performing other operations.

In addition, and substantially contemporaneously (as shown by the parallel illustration of steps 308 and 310 in FIG. 3), based on being notified, at least one of the other clients (i.e., that has job items to be processed using the shared resource) processes job items using the shared resource (step 310). For this operation, one or more of the other clients (e.g., other cores, the media processing subsystem, etc.) which have and/or have buffered memory access requests (i.e., memory access requests stored in a corresponding queue) processes those memory access requests. Note that, as shown in FIG. 3, there are two methods or ways to start using the shared resource to process job items. The first, i.e., step 308, is the given client itself using the shared resource to process job items from the queue in the given client, and the second, i.e., step 310, is the other client or clients using the shared resource to process job items based on receiving the notification from the given client.

By "substantially contemporaneously" as used herein, it is meant that the core (i.e., the given client) and the other clients send memory access requests to the memory subsystem at around the same time, starting approximately from when the notification is sent to other clients or received by the other clients. In this way, while the memory subsystem is in the higher-power mode and processing memory access requests, both the core and the other clients process their memory access requests using the memory subsystem. The memory subsystem handles the memory access requests received from the core and the other the clients (some or all of which may be received closely in time) by processing memory access requests in the order they were received, in a round robin fashion, etc.

In another optional operation, the given client then causes the shared resource to transition from the higher-power state to the lower-power state (step 312). For example, the core (i.e., the given client) causes a memory interface, a memory bus, and/or another functional block in the memory subsystem to transition to a sleep, hibernate, and/or other low-power state in which memory operations are limited or impossible from the higher-power state such as a normal or full-power operating state in which memory operations may be performed normally. By causing the transition between power states as described, the core places the memory subsystem in a lower-power state, thereby conserving electrical power, avoiding generating heat, etc.

Operation 312 is "optional" in that the given client may not handle transitioning the shared resource to the lower-power state. For example, an operating system, a software application, a power controller, and/or another entity in the computing device may automatically transition the memory subsystem into the lower-power state based on one or more power policies, idle timers, etc. In this case, the shared resource is transitioned to the lower-power state independently of the operations of the given client and/or the other clients. For example, an operating system, a power controller, etc. may determine that no clients have used the shared resource for a given time (after all the clients have finished processing job items using the shared resource) and cause the shared resource to transition to the lower-power state. With regard to the operations shown in FIG. 3, therefore, the given client and the other clients may simply process their memory access requests until they are completed and then disregard/ignore the power state of the memory subsystem.

In some embodiments, prior to step 312, the given client (or one of the other clients) communicates one or more messages, signals, etc. to the remaining clients to request or command that the remaining clients stop using the shared resource to process job items and/or stop using the shared resource within a specified amount of time. In some of these embodiments, in response to receiving the message, signal, etc., the remaining clients can stop using the shared resource and begin to buffer job items to be subsequently processed using the shared resource as described herein.

Hierarchical Arrangement of Clients

In some embodiments, at least some of the clients in the computing device are logically organized in a multi-level hierarchy, i.e., are considered by other clients and functional blocks to be grouped in corresponding levels of the hierarchy. In these embodiments, each level of the multi-level hierarchy includes a different set of one or more of the clients, so that each client is considered to be in at least one of the levels (and possibly not the others). In these embodiments, the organization of clients into levels can enable certain subsets of clients to function as groups for corresponding operations. For example, clients may communicate the notification herein described only to other clients in a same level or in a subset of the levels of the multi-level hierarchy. This enables the localized processing of job items by clients using shared resources that are associated with the level or otherwise selectively used by the clients in the level. For example, assuming that the media processing subsystem includes a fabric or interconnect that couples a number of clients (e.g., encoders, decoders, media processors, etc.) to a shared media memory in the media processing subsystem, the clients notify only other clients in a level associated with the media processing subsystem that job items are to be processed. By organizing the clients into levels as described, these embodiments can selectively notify clients of job item processing, which can extend the benefits of the client/shared resource operations herein described.

In some of these embodiments, notifications are sent between the levels of the multi-level hierarchy when certain shared resources are to be accessed to process job items. For example, a shared memory in the media processing subsystem is a locally shared resource that is shared between clients within the media processing subsystem, but the memory in the memory subsystem is a globally shared resource that is shared between clients in the media processing subsystem as well as other clients such as the cores and the network subsystem. In this case, therefore, notifications are sent between clients in different levels when accessing the globally shared resource.

Masked Clients

In some embodiments, one or more clients are designated as "masked" clients, which are clients that process job items independently of the one or more other clients in the computing device. For example, a first subset of two or more of the clients may be unmasked/normal clients that process job items based on receiving notifications as described herein. A second subset of one or more of the clients, however, may be masked clients that process job items independently of the other clients, i.e., at least partially without regard as to whether the other clients are processing job items. In this way, masked clients freely process job items, which can free, e.g., high-priority masked clients to immediately process job items without delay in waiting for a notification from another client.

In some embodiments, which clients are masked clients can be dynamically configured (i.e., is updateable at runtime as the computing device operates). For example, clients may be masked and unmasked depending on the type of operations that they are performing, software that is executing thereon, etc. In some embodiments, clients can be configured long-term or permanently as masked clients. For example, clients can be configured as masked clients using techniques such metal-stripping, fuses, etc. to configure which clients are masked.

Independent Processing of Job Items

In some embodiments, normal/unmasked clients sometimes process job items without first receiving a notification from another client and/or without notifying other clients. For example, clients may process job items without further delay and without notifying other clients upon determining that certain numbers or types of job items have been received, that a specified time has passed since the first buffered job item was received, etc. In some embodiments, clients use one or more measures of job progress, e.g., time of delay, operations stalled, type of operations being performed, nature of software application being executed, etc., to determine whether to process job items without further delay and without notifying other clients.

In some embodiments, some or all of the clients buffer job items in queues and process job items without further delay and without notifying other clients from the corresponding queue upon determining that certain numbers or types of job items have been buffered in the corresponding queue, that the time has passed, etc.

In some embodiments, a computing device (e.g., computing device 100 in FIG. 1 and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a non-transitory computer-readable storage medium that includes a database or other data structure which can be read by a computing device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which synthesizes the description to produce a netlist including a list of gates/circuit elements from a synthesis library that represent the functionality of the hardware including the above-described structures and mechanisms. The netlist is then be placed and routed to produce a data set describing geometric shapes to be applied to masks. The masks are then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for processing job items in a computing device that includes a plurality of clients and a resource, the method comprising:
   storing, by a given client of the plurality of clients, first job items in a queue for the given client;
   when the queue for the given client meets one or more conditions, notifying, by the given client, one or more other clients of the plurality of clients that the given client is to process job items using the resource;
   transitioning the resource from a lower-power state to a higher-power state in preparation for processing job items;
   processing, by the given client, the first job items from the queue for the given client using the resource; and determining, by the one or more other clients, based on the notifying, that the given client is to process job items using the resource and, responsive to the determining, commencing processing, by at least one other client that has second job items to be processed using the resource, the second job items using the resource, thereby coordinating processing of job items by the given client and the at least one other client using the resource so that the first and second job items are processed by the given client and the at least one other client substantially contemporaneously while the resource is in the higher-power state.

2. The method of claim 1, further comprising:
returning the resource to the lower-power state from the higher-power state after processing the first and second job items.

3. The method of claim 1, wherein:
the plurality of clients is logically organized in a multi-level hierarchy, with each level of the multi-level hierarchy including a different at least one of the plurality of clients, and
the notifying comprises notifying only other clients in a specified subset of the levels of the multi-level hierarchy, so that only the other clients in the subset of the levels process corresponding job items based on being notified.

4. The method of claim 1, further comprising:
storing, by the at least one other client, job items comprising the second job items in a queue for the at least one other client;
wherein processing the second job items comprises acquiring the second job items from the queue for the at least one other client.

5. The method of claim 4, further comprising, when storing the job items in the queue for the at least one other client, by the at least one other client:
upon exceeding a corresponding threshold for job items in the queue for the at least one other client, immediately processing at least some job items from the queue for the at least one other client, without first being notified by the given client.

6. The method of claim 1, wherein at least one client of the plurality of clients is a masked client, the masked client processing job items independently of the given client.

7. The method of claim 1, wherein the queue for the given client meets the one or more conditions when at least one of the following is true:
the first job items in the queue for the given client include more than a specified number of job items; or
the first job items in the queue for the given client include one or more specified types of job item.

8. The method of claim 1, wherein:
the first and second job items are requests to perform memory accesses and the resource is a memory subsystem in the computing device; and
processing the first and second job items using the resource comprises performing corresponding memory accesses using the memory subsystem.

9. The method of claim 1, wherein:
the first and second job items are requests to send or receive data via a network and the resource is a network subsystem in the computing device; and
processing the first and second job items using the resource comprises sending or receiving data using the network subsystem.

10. The method of claim 1, wherein:
the first and second job items are requests to process media data and the resource is a media processing subsystem in the computing device; and
processing the first and second job items using the resource comprises processing media data using the media processing subsystem.

11. A computing device that processes job items, comprising:
a plurality of clients; and
a resource;
wherein the computing device is configured to:
store, by a given client of the plurality of clients, first job items in a queue for the given client;
when the queue for the given client meets one or more conditions, notify, by the given client, one or more other clients of the plurality of clients that the given client is to process job items using the resource;
transition, by the given client, the resource from a lower-power state to a higher-power state in preparation for processing job items;
process, by the given client, the first job items from the queue for the given client using the resource; and
determine, by the one or more other clients, based on the notifying, that the given client is to process job items using the resource and, responsive to the determining, commence processing, by at least one other client that has second job items to be processed using the resource, the second job items using the resource, thereby coordinating processing of job items by the given client and the at least one other client using the resource so that the first and second job items are processed by the given client and the at least one other client substantially contemporaneously while the resource is in the higher-power state.

12. The computing device of claim 11, wherein the computing device is further configured to:
return the resource to the lower-power state from the higher-power state after processing the first and second job items.

13. The computing device of claim 11, wherein:
the plurality of clients is logically organized in a multi-level hierarchy, with each level of the multi-level hierarchy including a different at least one of the plurality of clients, and
when notifying the one or more other clients, the computing device is further configured to notify only other clients in a specified subset of the levels of the multi-level hierarchy, so that only the other clients in the subset of the levels process corresponding job items based on being notified.

14. The computing device of claim 11, wherein:
the computing device is further configured to store, by the at least one other client, job items comprising the second job items in a queue for the at least one other client; and
processing the second job items comprises acquiring the second job items from the queue for the at least one other client.

15. The computing device of claim 14, wherein the computing device is further configured to, when storing the job items in the queue for the at least one other client, by the at least one other client:
upon exceeding a corresponding threshold for job items in the queue for the at least one other client, immediately process at least some job items from the queue for the at least one other client, without first being notified by the given client.

16. The computing device of claim 11, wherein at least one client of the plurality of clients is a masked client, the masked client processing job items independently of the given client.

17. The computing device of claim 11, wherein the queue for the given client meets the one or more conditions when at least one of the following is true:
  the first job items in the queue for the given client include more than a specified number of job items; or
  the first job items in the queue for the given client include one or more specified types of job item.

* * * * *